United States Patent [19]

Shuknecht

[11] Patent Number: 5,024,278

[45] Date of Patent: Jun. 18, 1991

[54] HARVESTING MACHINE HAVING BLOWER DAMAGE PREVENTION MEANS

[75] Inventor: Lee N. Shuknecht, Elba, N.Y.

[73] Assignee: Lee Shuknecht & Sons, Inc., Elba, N.Y.

[21] Appl. No.: 479,141

[22] Filed: Feb. 9, 1990

[51] Int. Cl.[5] .................. A01D 23/04; A01D 33/02
[52] U.S. Cl. ........................... 171/17; 56/12.8; 56/327.1; 171/41
[58] Field of Search ............... 56/12.8, 121.42, 121.44, 56/327.1; 460/135, 143; 171/17, 31, 40, 41, 42

[56] References Cited

U.S. PATENT DOCUMENTS

| | | | |
|---|---|---|---|
| 2,509,970 | 5/1950 | Edmonds | 56/30 |
| 2,547,878 | 4/1951 | Marshall | 171/34 |
| 2,553,519 | 5/1951 | Lenz | 171/17 |
| 2,717,077 | 9/1965 | Leighton | 209/139.1 |
| 2,750,977 | 6/1956 | Vella et al. | 171/17 |
| 3,193,020 | 7/1965 | Button | 171/14 |
| 3,285,306 | 11/1966 | Wetzel | 171/17 X |
| 3,989,110 | 11/1976 | Medlock | 171/28 |
| 4,364,222 | 12/1982 | Ramacher | 56/328.1 |
| 4,574,567 | 3/1986 | Morellini | 56/16.5 |
| 4,629,005 | 12/1986 | Hood | 171/20 |
| 4,753,296 | 6/1988 | Kruithoff | 171/17 X |

Primary Examiner—Ramon S. Britts
Assistant Examiner—David J. Bagnell
Attorney, Agent, or Firm—Martin Lukacher

[57] ABSTRACT

A harvesting machine is especially adapted for automatic topping and loading of crops, such as onions. The crops are gathered from the field and elevated on a conveyor to a region adjacent to which a topping device (a sickle) is disposed. The conveyor has openings to permit the passage of air which is blown from a blower. The openings are sufficiently narrow to support the crop while allowing rocks, clumps and other debris to drop therethrough. The blower is offset from the topping region. A duct extends tangentially and upwardly from the blower to direct a laminar (non-turbulent) flow of air through the conveyor openings for extending the tops. The duct has a wall at the bottom thereof which faces the region. This wall has a passage, preferably with louvers which extend generally vertically. A negative pressure is developed adjacent to these louvers and a generally laminar flow of air passes upwardly through the louvers and enhances the laminar flow through the conveyor in the region where topping occurs. The rocks, clumps and other debris fall downwardly through the louvers and out of the machine thereby preventing damage to the blower.

26 Claims, 5 Drawing Sheets

HARVESTING MACHINE HAVING BLOWER DAMAGE PREVENTION MEANS

DESCRIPTION

The present invention relates to harvesting machines, and particularly to machines for harvesting crops and automatically removing tops from such crop.

The invention is especially adapted for use in the automatic topping and loading mechanism of an onion harvester wherein air is blown through the onion plants as picked up from the field, as they are conveyed through the harvester, so as to extend the tops which grow from the plants and enable them to be cut off. The topped onion bulbs then being carried out of the machine as by being dropped onto a conveyor which carries them to a truck, cart or other transport which moves along side the harvesting machine over the field where the onions are being harvested. It will be appreciated that the invention may also be adapted for use in harvesting crops similar to onions, especially when tops, stems or other parts of the plant must be cut off in the harvesting process.

Onions are generally grown in fields having muck (humus soil) which is generally free of rocks. The onions are harvested after the plants are dug, usually with an automatic digging machine. The plants are usually left on the ground, (together with their tops which grow from the onion plant) until dry. Then only dry fine soil is present on and among the crop. The crop is elevated on a conveyor to a topping region. There a blast of air from a blower directly under the topping region extends the tops so that they can be cut off as they move along the topping region. The fine soil blows away with the tops and there are no rocks which can drop into and destroy or otherwise interfere with the operation of the blower. Onions and similar crops are also grown in mineral soils which contain clay, heavy sand or loam, and stones (usually on highlands). Then, automatic topping mechanisms become unusable because of the damage to the blower. Also, automatic topping may be impractical even in muck soils when, due to moisture or humidity, clumps of soil are present. Therefore, in harvesting of crops grown in mineral soils or where clumping is expected, topping is usually carried out by hand; the farm workers lifting the plants by their tops and cutting the onion bulbs off with a knife, scythe, machete or the like.

It is the principal object of the present invention to provide an improved harvesting machine which enables automatic topping to be carried out when harvesting crops, such as onions, from fields having mineral soil or even muck types of soil which have not dried out.

It is another object of the present invention to provide an improved topping mechanism for a harvesting machine wherein topping is carried out with the aid of air blown from a blower whereby damage or destruction of the blower by rocks, clumps and similar debris is avoided.

It is a still further object of the present invention to provide an improved mechanism for topping and loading bulb type crops, such as onions, which enables rocks, clumps and other debris to be removed while tops of the crop are extended so that they may cut off a bulb portion of the crop plant.

Briefly described, the invention, as embodied in a harvester wherein a crop is carried by a conveyor which supports the crop and has openings through which materials smaller than the crop can fall and through which air can be blown, utilizes means on the harvester for supporting the blower offset from a region through which the conveyor passes. Means are provided for communicating air driven by the blower to the region. The communicating means provides a passage, preferably under the region through which the materials can fall out of the harvester without damage to the blower, thereby enabling the harvester to be used in harvesting crops on fields of mineral (rock bearing) soil or fields having muck (humus soil) where conditions of moisture and humidity cause clumps of the soil to be formed which might otherwise damage the blower.

The foregoing and other objects, features and advantages of the invention as well as a presently preferred embodiment thereof and the best mode now known for practicing the invention will become more apparent from a reading of the following description in connection with the accompanying drawings in which:

Figure 1:
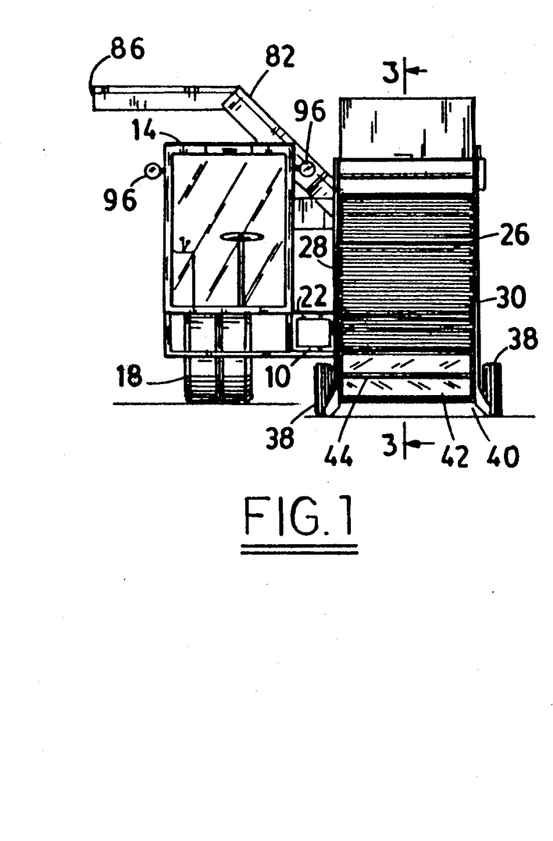
FIG. 1 is a front elevational view of a harvesting machine embodying the invention.
Figure 2:
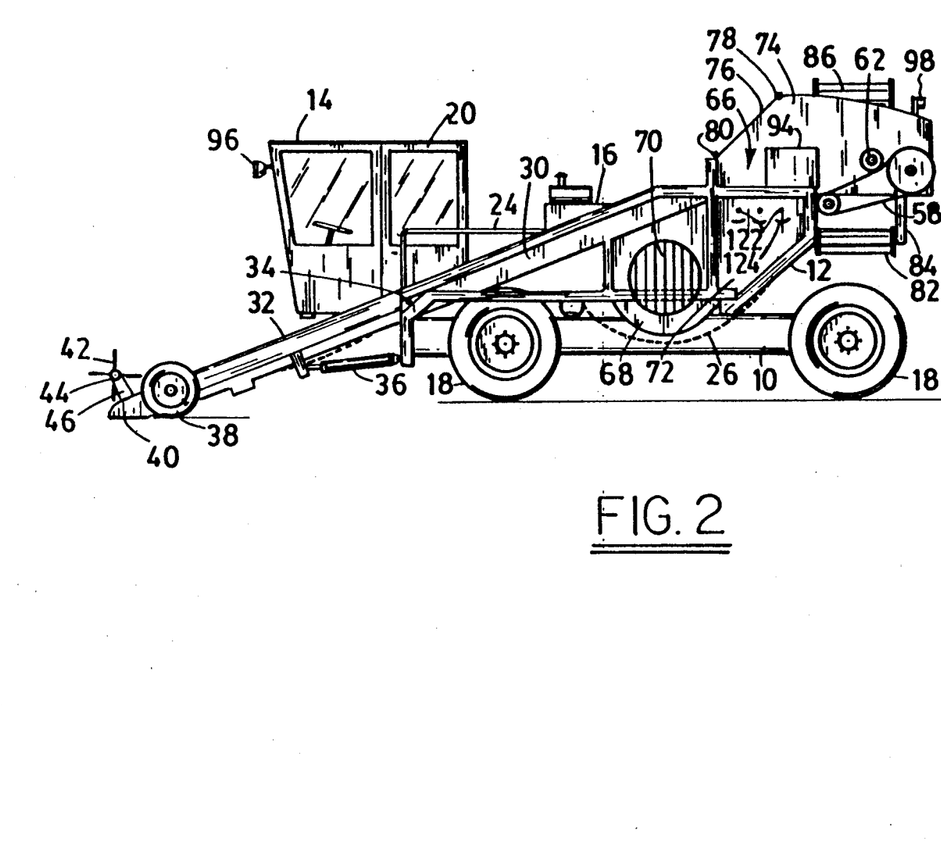
FIG. 2 is a side elevation of the machine shown in FIG. 1.

Referring to FIGS. 1 and 2, there is shown a self-propelled onion harvesting machine embodying the invention. The machine has a chassis 10 provided by a hollow beam to which a framework 12 is connected. A cab 14 is mounted on the chassis, as is an engine 16, suitably a diesel. Axles extending from the chassis carry four wide, off-road tires 18. The operator enters the cab through a door 20. A walkway 22 and handrail 24 extend along side the cab. The harvester may be hydraulically driven both for propulsion and motivation of all of its rotating and reciprocating mechanisms. A hydraulic pump (not shown) is driven by the engine 16 for such purposes.

An elevating conveyor 26 is carried in a trough 26 having side walls 28 and 30. A front section 32 of the trough is pivotally mounted at the front end 34 of the framework 12 and may be lifted by a hydraulic cylinder 36 so as to enable the harvester to travel on roads and highways from field to field. The front end of the trough is carried on tires 38. Ahead of the tires is a scoop 40. A paddle wheel 42 is mounted on an axle 44 extending from arms 46. The paddle wheel turns in a direction reverse to the direction of the conveyor 26. When the harvester is used, the onions have already been dug up from the ground and are lying on the ground in rows. The onions are scooped onto the conveyor 26; the paddle wheel 42 assisting the onion plants onto the conveyor 26 which at this point in the process consist of the bulbs and the tops. Any rocks, trash and other materials are also scooped onto the conveyor. The paddle wheels also even the flow of the onion plants and the rocks, soil and other materials onto the conveyor.

The conveyor is provided by rods, the ends of which are bent into hooks extending 90° to the rods. These hooks are linked together so that the conveyor provides a chain (a chain conveyor). The upper reach 48 (FIG. 3) of the chain is supported either on guide bars or rollers which underlie the reach 48. The lower reach 50 is supported on rollers 52 and drapes itself around these rollers. Sprockets 54 and 56 (see FIG. 3) at the forward and rear end of the chain conveyor 26 are provided. The rear sprocket 56 is driven via a pulley and belt mechanism 58; the rear pulley 60 of this mechanism being driven by a hydraulic motor (not shown). The belt of the belt mechanism 58 may be tensioned by a pulley 62.

Figure 3:
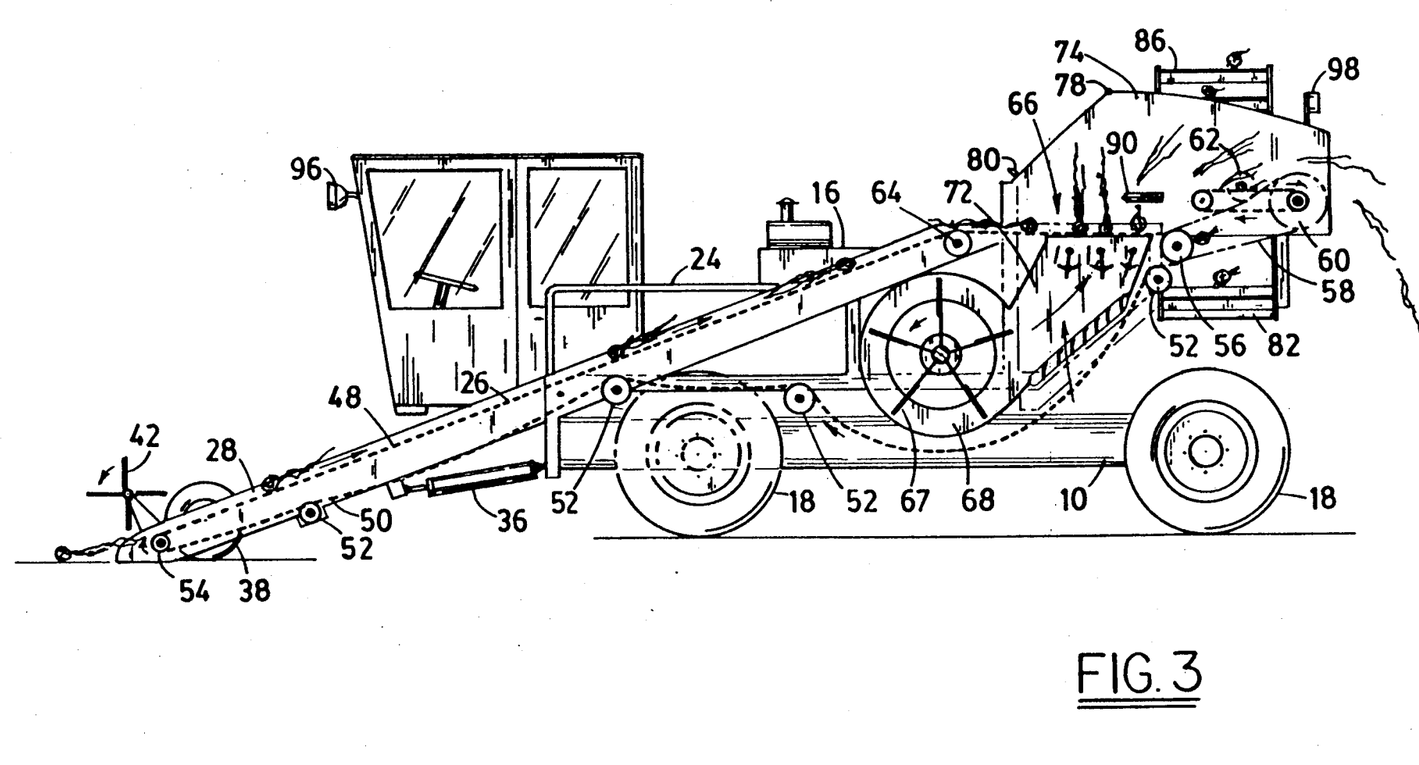
FIG. 3 is a sectional view taken along the line 3—3 in FIG. 1.

As shown also in FIG. 3, the rear sprocket 56 and a pair of guide rollers, one of which 64 is shown in FIG. 3, define the generally horizontal region 66 of the conveyor where the crop (shown as onions with their tops) is supported during topping operations. The chain conveyor bars are spaced from each other so as to provide openings which are sufficiently close together to enable the conveyor to support the onion bulbs. For example, they may be approximately one inch apart. Then the harvester will be capable of harvesting onions from approximately one inch diameter to the so-called colossal size onions (4-5 inches in diameter). Rocks, clumps and other debris may then fall through the gaps between the rods. Also, small onions (so-called pearl size) can also fall through the gaps between the rods of the chain conveyor 26. Much of such debris does fall out prior to reaching the topping region 66. However, larger clumps and rocks, some clinging to the plants and others which are sufficiently narrow in one dimension to fall through the gaps but straddle successive rods, are carried up through and into the topping region 66.

Returning to FIGS. 1 and 2, the framework 12 carries a blower 67 which is contained in a blower housing 68. Protective grills 70 are mounted on opposite sides of the blower housing covering air inlet openings into the blower housing 68. A duct 72 carries air pumped by the blower to the topping region 66 where it is blown through the platform provided by the bars of the conveyor as it travels through the topping region.

Above the topping region 66 and extending rearwardly of the machine is a hood 74. The front wall 76 of this hood is inclined and may be provided by a door which is hinged at 78 and may be opened by a handle 80. A cross-conveyor 82 is mounted on the frame 12 and on a depending strut 84 of the frame. The onions are topped by a sickle bar cutter 90 (FIG. 3) and the bulbs remaining drop off the chain conveyor 26 onto the cross-conveyor 82. The cross-conveyor 82 loads the crop into a truck or other conveyance; the crop dropping off the rear end 86 of the conveyor 82. The cross-conveyor 82 may be made of slats, preferably of rubber or other elastomeric material, having flights extending crosswise thereof.

A sickle mechanism is disposed in the hood 74. The mechanism for supporting and driving the sickle blades is disposed at the ends thereof and contained outside the hood 74 under a cover 94. Headlights 96 and tail lights 98 are provided at the forward and rear end of the harvesting machine.

Figure 4:
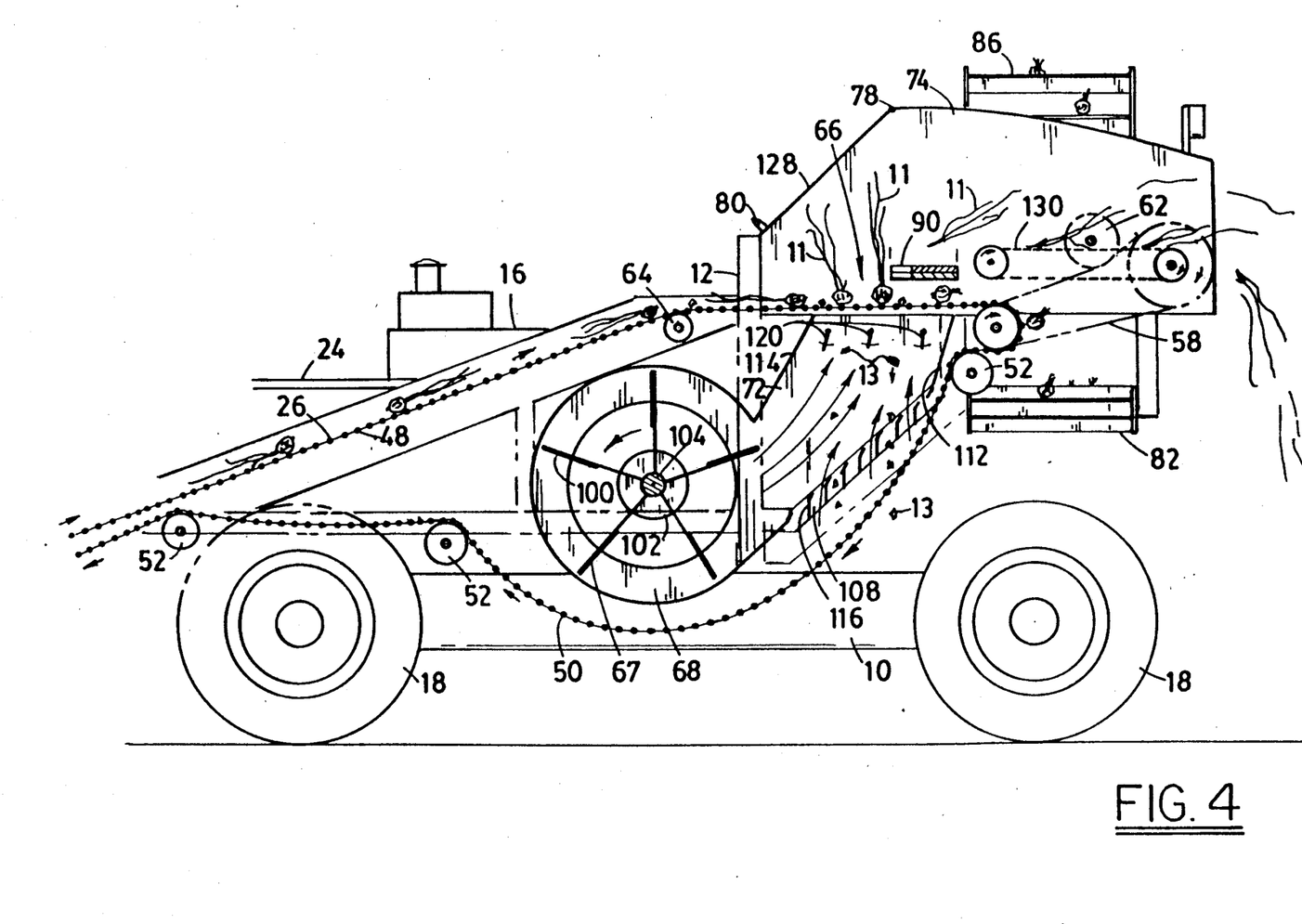
FIG. 4 is an enlarged fragmentary cross section of the rear of the machine shown in FIG. 3 illustrating the automatic topping and loading mechanism which is provided in accordance with the herein illustrated and presently preferred embodiment of the invention.
Figure 5:
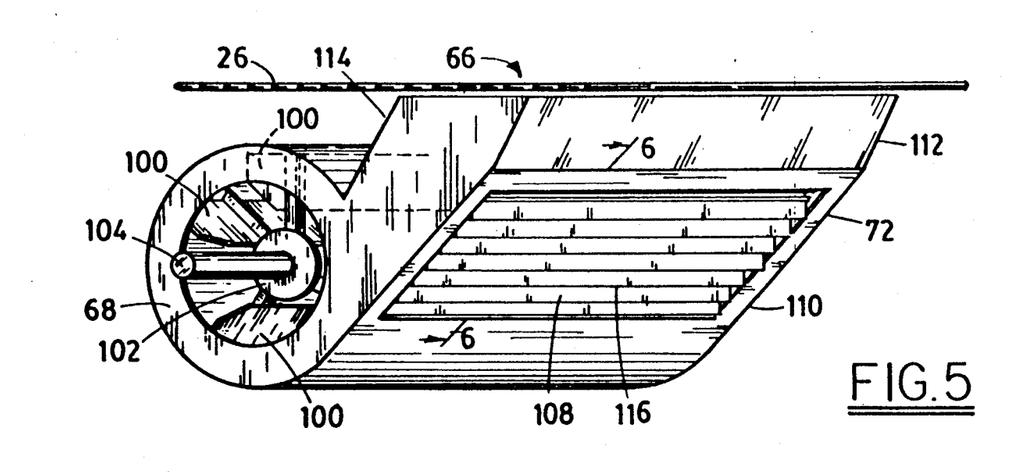
FIG. 5 is a perspective view of the blower and duct of the automatic topping mechanism and of the conveyor in the region where topping occurs.

As shown in FIGS. 3 and 4 and also in FIG. 5, the blower 67 has a centrifugal or squirrel cage fan having blades 100 attached to hubs 102 on a shaft 104. The shaft 104 is driven by a hydraulic motor, for example, at approximately 1,200 rpm. The shaft 104 of the blower may be mounted on pillow blocks attached to the frame 12. It may be desirable to mount a heat exchanger (not shown) on the blower housing through which oil pumped by the hydraulic pump driven by the engine 16 may pass and be cooled. The duct 72 extends tangentially from the blower and directs a flow of air through the region 66. The walls of the duct are inclined upwardly from the blower 67 which is disposed below and offset from the region 66. Notwithstanding that the blower is so offset, a strong blast of air flows laminarly through the gaps in the chain conveyor 26 where it forms a platform for the crop in the region 66. This laminar flow is desired and turbulent flow is undesirable. This is because laminar flow is needed to extend the tops 11 vertically (much like parachutes) as well as to untangle the tops. Further the strong blast loosens any rocks or clumps which may cling to the crop or be supported on the chain conveyor in the region 66.

These rocks, clumps and other debris fall downwardly through a passage 108 in the lower wall of the duct 72. It will be noted that the lower wall is in two parts 110 and 112. The lower part 110 contains a passage 108 and the upper part 112 is generally parallel to the front wall 114 of the duct. The front and rear walls in the area of the lower wall 110 diverge slightly.

Figure 6:
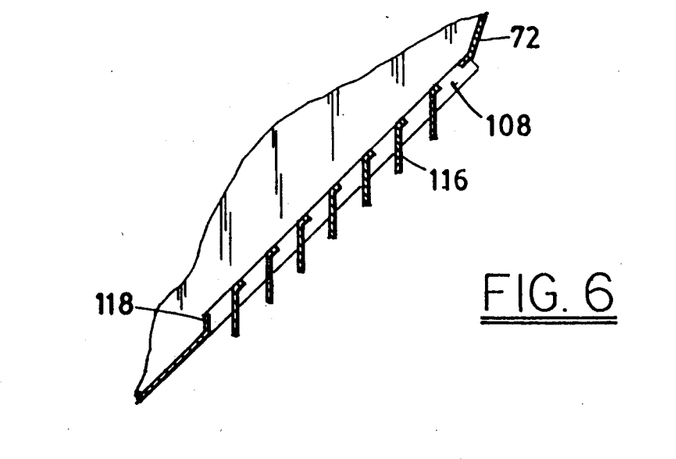
FIG. 6 is a fragmentary sectional view taken along the line 6—6 in FIG. 5.

It is believed that principally because of the high velocity air flow, aide somewhat by the diverging throat area of the duct (between the wall 114 and the lower wall section 110) a suction or negative (below atmospheric) air pressure is created outside the duct in the vicinity of the passage 108. Air is sucked in through the passage 108 and a laminar flow of air of high velocity and high volume is blown through the gaps between the bars of the conveyor 26. Louvers or vanes 116 are provided by plates which may be welded or attached to a lip 118 around the edge of the passage 108. These louvers are generally perpendicular to the platform defined by the conveyor in the region 66 (viz. the vanes or louvers 116 are generally vertical). They assist in providing a laminar, non-turbulent flow through the platform.

Baffle plates 120, which may be three or four in number, may be independently, pivotally mounted transversely of the duct. The pivots are shown at 122 in FIG. 2. Bolts extending through slots 124 may be used to adjust the veins at a desired angular inclination. Inclination may be changed depending upon humidity and field conditions. Thus, these independent baffle plates 120 further assist in assuring that the flow of air through the platform is laminar and not turbulent.

The hood 74 further assists in directing the air. The forward wall or door 128 of the hood 74 is inclined upwardly away from the region 66 and directs the air after the tops 11 have been extended toward the rear of the machine. This rearwardly directed air picks up the tops 11 and deposits them on a discharge conveyor 130 which may be driven by the rear pulley of the belt drive 58 which drives the chain conveyor 26. The discharge conveyor 130 carries the tops rearwardly and discharges them out of the rear of the harvesting machine.

Figure 4A:
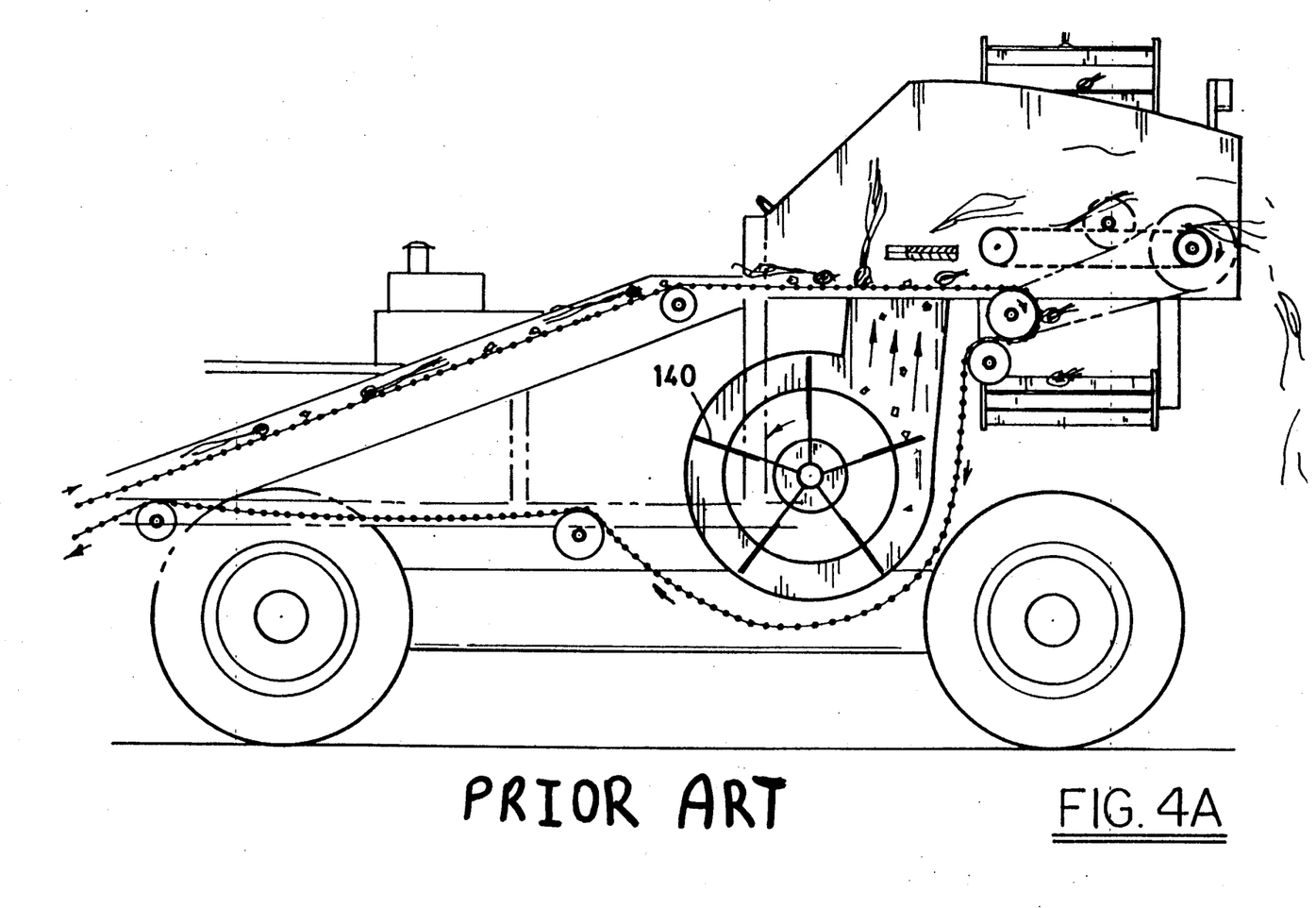
FIG. 4A is a view similar to FIG. 4 showing the problem which is solved by the invention.

Referring to FIG. 4A, the problem of rocks and other debris falling through the conveyor into a blower 140 disposed below a region of a harvester where topping occurs will be apparent. These rocks and other debris strike the blades of the blower (the fan blades). Such impact damages the blades and eventually destroys the blower. This problem is not only alleviated through the use of the invention, but air flow direction (laminar flow) through the topping region 66 is improved and intensified in flow rate. The operation of the automatic topping and loading mechanism of the harvester is therefore greatly improved.

From the foregoing description, it will be apparent that there has been provided an improved harvesting machine and particularly an improved topping and loading mechanism therefor. Variations and modifications in the herein described machine, within the scope of the invention, will undoubtedly suggest themselves to those skilled in the art. Accordingly, the foregoing description should be taken as illustrative and not in a limiting sense.

I claim:

1. In a harvester wherein a crop is carried by a conveyor which supports the crop and having openings through which materials smaller than the crop can fall and through which air can be blown in a region through which said conveyor passes from a blower, the improvement comprising means on said harvester for supporting said blower offset from said region, and means having an outlet for communicating air driven by said blower through said outlet to said region and for providing a passage below said outlet for said materials out of said harvester and for air in addition to air from said blower.

2. The improvement according to claim 1 wherein said supporting means includes means for supporting said blower below said region, and said passage is opposite to said blower.

3. The improvement according to claim 1 wherein said conveyor defines a platform for said crop as it travels through said region, and further comprising baffles in said communicating means for directing the flow of air transverse to said platform.

4. The improvement according to claim 3 wherein said baffles are plates, and means for adjustably disposing said plates independently of each other at selected angles of tilt with respect to said platform.

5. The improvement according to claim 1 wherein said conveyor defines a platform for said crop as it travels through said region, and wherein said crop has tops which are extended by the air blown through said conveyor in said region, and cutting means space from said platform and disposed to the rear of said platform and the direction of travel of said conveyor for severing said tops while they are extended.

6. The improvement according to claim 5 further comprising another conveyor disposed rearwardly of said region for collecting said crop after it leaves said region.

7. The improvement according to claim 6 further comprising still another conveyor disposed rearwardly of said region and spaced from said platform in a direction in which said tops are extended for collecting said tops and carrying them out of said harvester.

8. The improvement according to claim 7 further comprising a hood disposed over said region and over said still another conveyor for directing the air blown through said region rearwardly to carry said tops to said still another conveyor.

9. The improvement according to claim 1 further comprising a hood spaced from said region for directing the flow of air through said region, said hood having a wall, inclined with respect to said region.

10. The improvement according to claim 9 wherein said wall has a door providing access to said region.

11. The improvement according to claim 1 wherein said conveyor has a multiplicity of rods linked at their ends to define a chain, said rods being spaced from each other in the direction of travel of the conveyor to define gaps extending laterally thereof, said gaps providing said openings.

12. The invention according to claim 1 wherein the crop is vegetables having a top.

13. The invention according to claim 12 wherein said vegetables are onions.

14. In a harvester wherein a crop is carried by a conveyor which supports the crop and having openings through which materials smaller than the crop can fall and through which air can be blown in a region through which said conveyor passes from a blower, the improvement comprising means on said harvester for supporting said blower offset from said region, and means for communicating air driven by said blower to said region and for providing a passage for said materials out of said harvester and for air in addition to air from said blower, and louvers across said passage for directing air flowing through said passage to said region.

15. In a harvester wherein a crop is carried by a conveyor which supports the crop and having openings through which materials smaller than the crop can fall and through which air can be blown in a region through which said conveyor passes from a blower, the improvement comprising means on said harvester for supporting said blower offset from said region, and means for communicating air driven by said blower to said region and for providing a passage for said materials out of said harvester and for air in addition to air from said blower, and wherein said communicating means is a duct extending upwardly from said blower to said region, such duct having a wall below said region, said passage being in said wall.

16. The improvement according to claim 15, wherein said blower has a cylindrical housing, a centrifugal fan in said housing, said duct extending tangentially from said housing, means supporting said conveyor defining a generally horizontal platform in said region, said wall being inclined generally upwardly with respect to the horizontal and said passage also being inclined generally upwardly with respect to the horizontal.

17. The improvement according to claim 16 wherein said passage has a plurality of louvers therein which are disposed generally vertically, as as to direct said air to flow generally laminarly through said region.

18. The improvement according to claim 17 further comprising a plurality of baffle plates extending across said duct between said passage and said platform for assisting in directing said air to flow generally laminarly through said region.

19. The improvement according to claim 18 wherein said crop has tops which are extended vertically due to the flow of air laminarly through said region, and means disposed above said region rearwardly in the direction of travel of said conveyor for severing said tops while they are extended.

20. The improvement according to claim 19 further comprising a hood spaced above said region, said hood having a wall inclined rearwardly with respect to the horizontal for directing the air blown through said region so that the tops are carried by said air in a direction away from said region.

21. The improvement according to claim 20 wherein said hood has a forward wall and a rearward wall, said forward wall being disposed over said region and being inclined upwardly, said rearward wall extending from said forward wall toward the rear of said harvester.

22. The improvement according to claim 21 further comprising a door pivotally mounted in said hood and comprising said forward wall.

23. In a harvester for a crop being harvested accompanied by debris, such as rocks and soil clumps, which passes from one side to the other side of a region in said harvester, said harvester having a blower, the improvement comprising an air flow apparatus for processing said crop which comprises a duct having sides which define said region and said sides of said region, said blower being deposed spaced from said sides and being in air communicating relationship with said duct, said duct having passageway below said region through which said debris falls.

24. The improvement according to claim 23 wherein said blower has blades, said blades being spaced away from said sides out of the way of said debris which falls down from said region.

25. The improvement according to claim 23 wherein said duct has a side wall extending upwardly across said region in the direction from one of said sides to the other of said sides, said wall having said passageway therein.

26. The improvement as set forth in claim 25 wherein said blower is below said region and said duct extends in a direction tangentially upwardly from said blower to said region, said passageway also extending in said direction.

* * * * *

(12) EX PARTE REEXAMINATION CERTIFICATE (7615th)
United States Patent
Shuknecht (10) Number: US 5,024,278 C1
(45) Certificate Issued: Jul. 20, 2010

(54) HARVESTING MACHINE HAVING BLOWER DAMAGE PREVENTION MEANS

(75) Inventor: Lee N. Shuknecht, Elba, NY (US)

(73) Assignee: Lee Shuknecht & Sons, Inc., Alba, NY (US)

Reexamination Request:
No. 90/010,610, Aug. 28, 2009

Reexamination Certificate for:
Patent No.: 5,024,278
Issued: Jun. 18, 1991
Appl. No.: 07/479,141
Filed: Feb. 9, 1990

(51) Int. Cl.
A23N 15/00 (2006.01)
A23N 15/08 (2006.01)
A01D 23/04 (2006.01)
A01D 33/00 (2006.01)
A01D 33/02 (2006.01)

(52) U.S. Cl. .................. 171/17; 171/41; 56/12.8; 56/327.1

(58) Field of Classification Search .................. None
See application file for complete search history.

(56) References Cited

U.S. PATENT DOCUMENTS

| 2,162,392 | A | 3/1939 | Solomon, Jr. et al. |
| 2,750,977 | A | 6/1956 | Vella et al. |
| 2,849,118 | A | 8/1958 | Ashton |
| 3,429,438 | A | 2/1969 | Palmen et al. |
| 3,469,691 | A | 9/1969 | Boyce |
| 4,364,222 | A | 12/1982 | Ramacher |

*Primary Examiner*—Peter C. English (57) ABSTRACT

A harvesting machine is especially adapted for automatic topping and loading of crops, such as onions. The crops are gathered from the field and elevated on a conveyor to a region adjacent to which a topping device (a sickle) is disposed. The conveyor has openings to permit the passage of air which is blown from a blower. The openings are sufficiently narrow to support the crop while allowing rocks, clumps and other debris to drop therethrough. The blower is offset from the topping region. A duct extends tangentially and upwardly from the blower to direct a laminar (non-turbulent) flow of air through the conveyor openings for extending the tops. The duct has a wall at the bottom thereof which faces the region. This wall has a passage, preferably with louvers which extend generally vertically. A negative pressure is developed adjacent to these louvers and a generally laminar flow of air passes upwardly through the louvers and enhances the laminar flow through the conveyor in the region where topping occurs. The rocks, clumps and other debris fall downwardly through the louvers and out of the machine thereby preventing damage to the blower.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 17-22 is confirmed.

Claims 1-16 and 23-26 are cancelled.

* * * * *